May 9, 1933.   R. H. STEVENS ET AL   1,907,894
APPARATUS FOR MANIPULATING ANNULAR BODIES
Filed Oct. 25, 1930   5 Sheets-Sheet 3

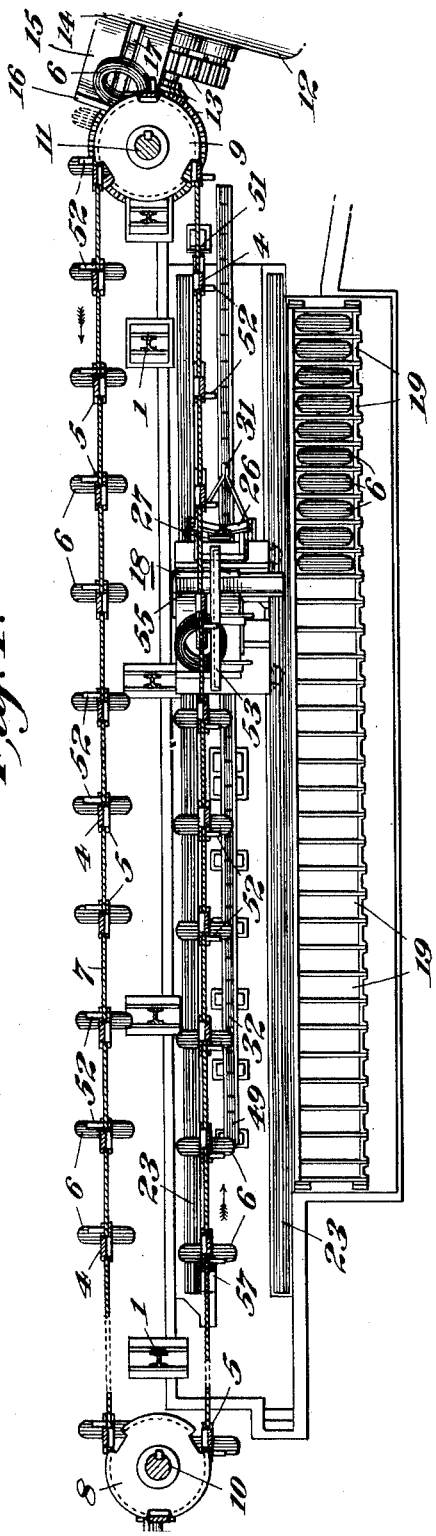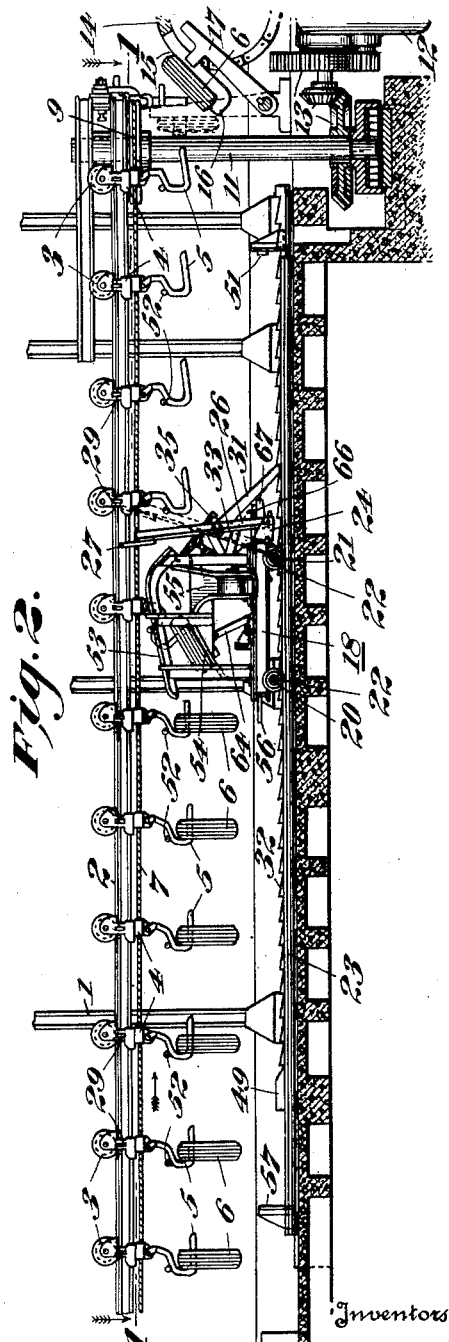

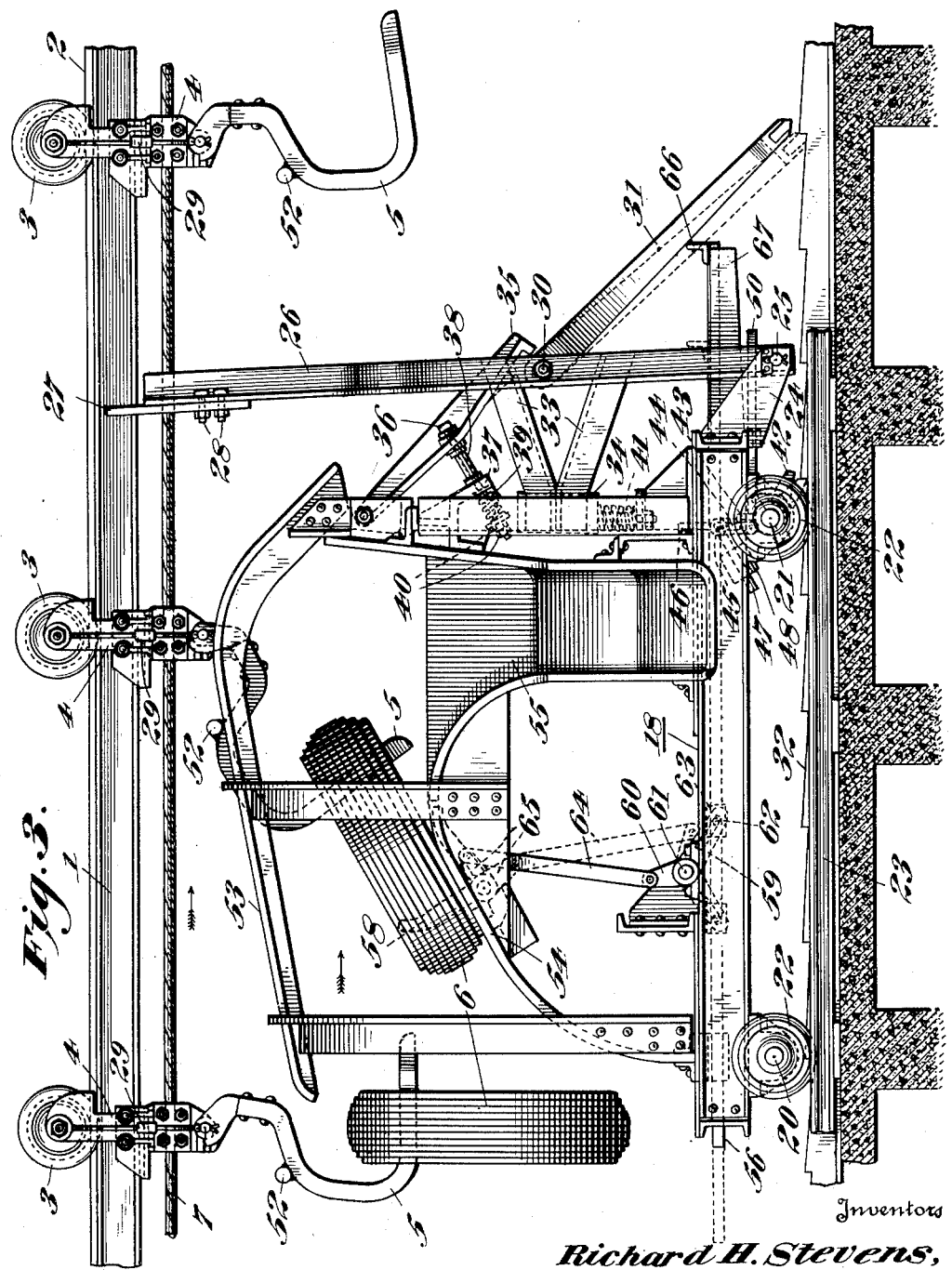

Inventors
Richard H. Stevens,
William C. Frank and
Harry T. Kelly.
By R. S. C. Dougherty.
Attorney

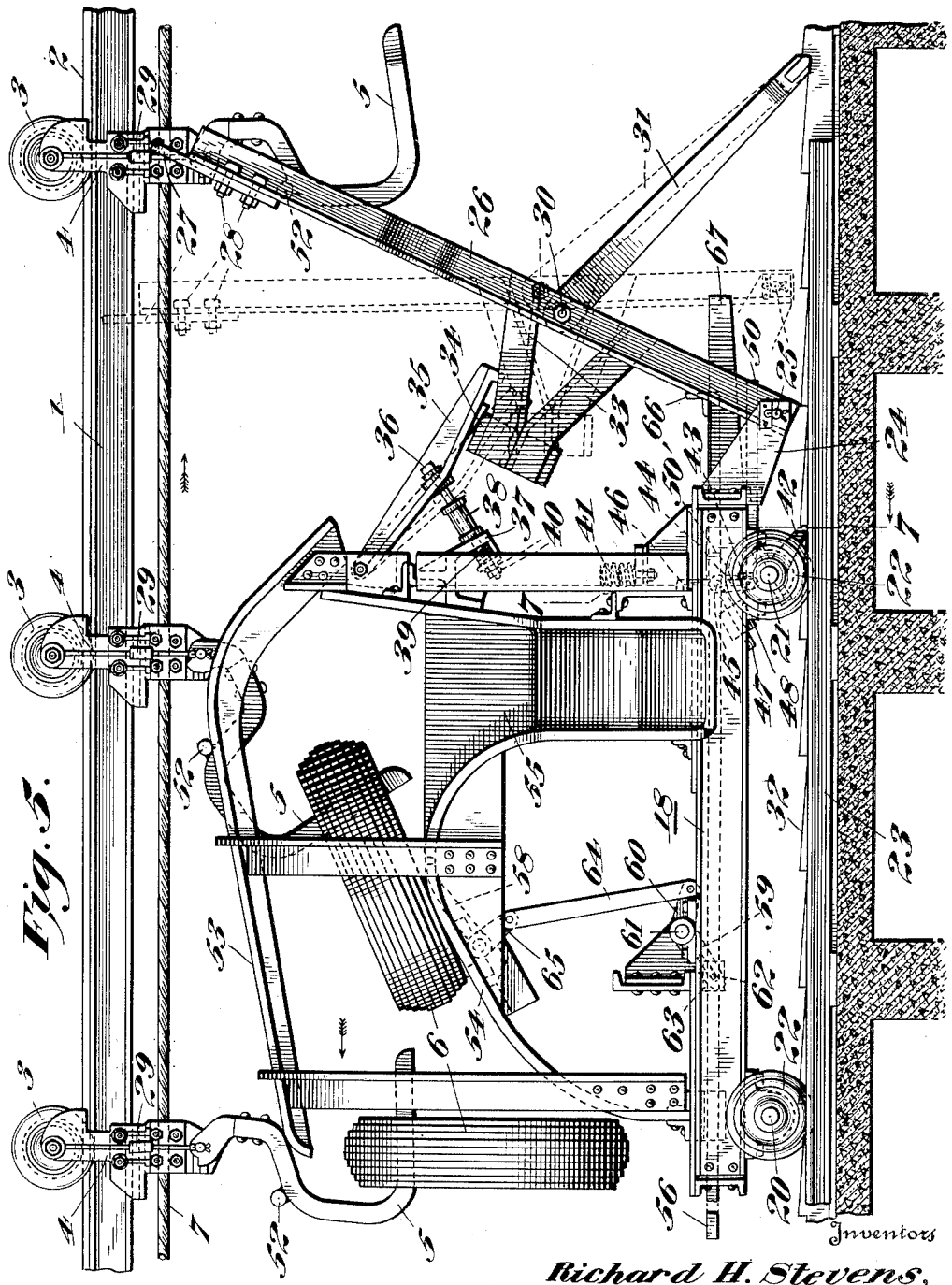

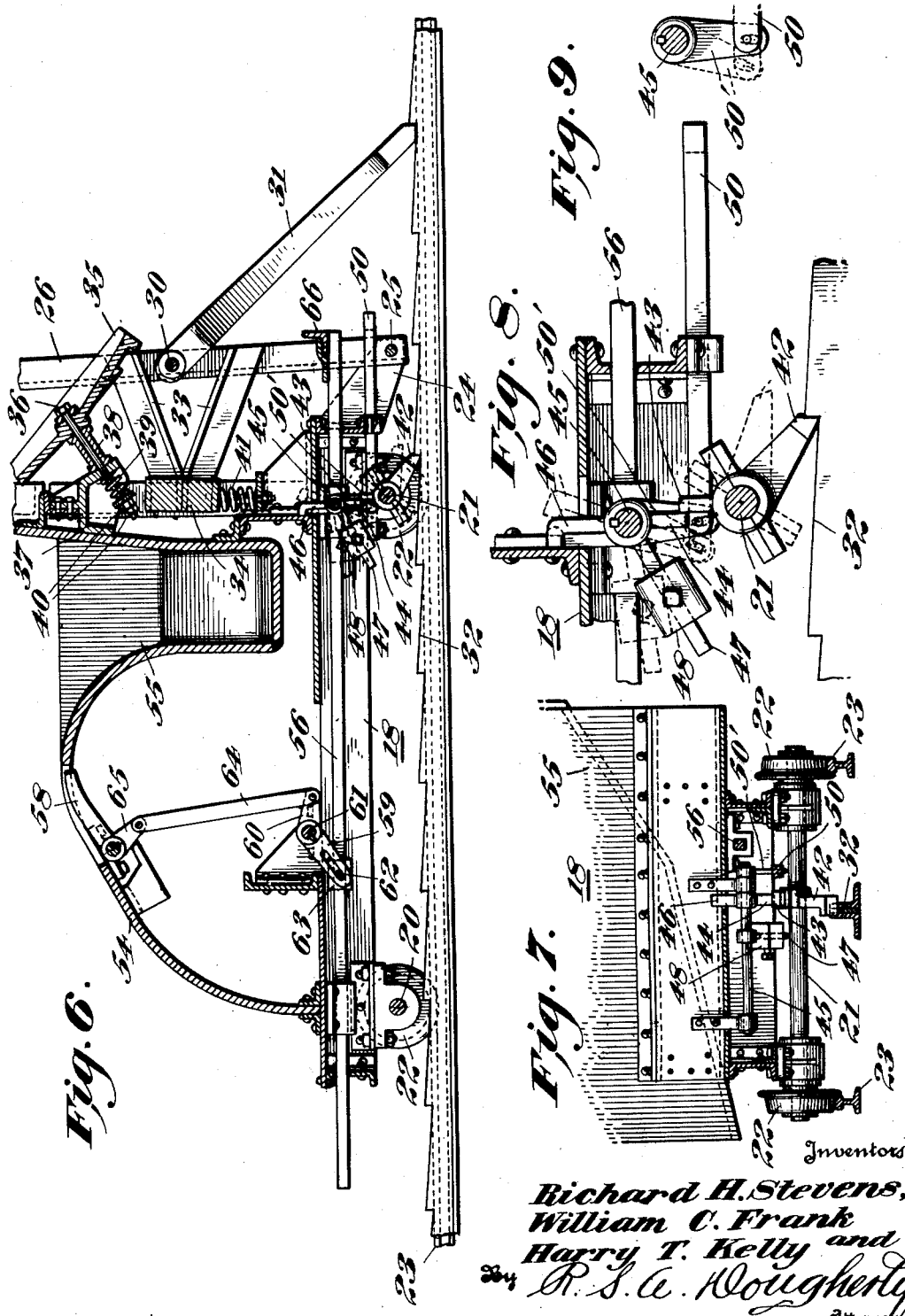

Patented May 9, 1933

1,907,894

UNITED STATES PATENT OFFICE

RICHARD H. STEVENS, OF BALTIMORE, MARYLAND, AND WILLIAM C. FRANK AND HARRY T. KELLY, OF JOHNSTOWN, PENNSYLVANIA, ASSIGNORS TO BETHLEHEM STEEL COMPANY, A CORPORATION OF PENNSYLVANIA

APPARATUS FOR MANIPULATING ANNULAR BODIES

Application filed October 25, 1930. Serial No. 491,248.

Our invention relates to apparatus for manipulating annular bodies preferably heavy coiled bundles of rod stock, wire, strip or the like material used for commercial purposes.

In the manufacture of a stock bar to form rods or the like for certain purposes it is the usual practice to conduct the hot freshly rolled shape after it passes through the finishing roll pass into a tubular guide which conducts it directly to a reeling mechanism from which the coiled bundle of rod stock or similar material is transferred to a means for conveying and slowly cooling the coils or bundles by exposing them to the atmosphere. After the coils have been sufficiently cooled by the conveyer they are transferred to a place of storage for further use or reduction into commercial articles. The conveyer is adapted to be continuously driven in any approved manner and has a plurality of hangers spaced at equal distances apart and connected together by a cable. Each hanger is suspended from a trolley-wheel adapted to travel on a continuous track. A hook is pivoted to the lower end of each hanger to which the coils or bundles are suspended as they are advanced from the feeding to the delivery points of the conveyer. This construction being similar to that shown in applicants' drawings to illustrate the application of their invention. As these coils or bundles are of considerable weight it has been the usual practice in discharging them from the conveyer to lift them off the hooks singly or in multiple by means of a traveling hoist which has its line of travel at the side or over the top of the conveyer, which requires continual operation, provided the conveyer is continuously driven and as the coils are traveling with the conveyer and are still quite hot some difficulty has been experienced in handling or manipulating the coils when they are discharged from the conveyer.

One of the objects of our invention relates to the manner of automatically discharging the annular bodies, coils or bundles from the conveyer and depositing them side by side in bins.

Another object of our invention relates to means for discharging the coils, adapted to be operated in a step-by-step backward movement by the forward movement of the conveyer.

Another object of our invention relates to the manner of reversing the movement of the discharging car at the end of each line of travel after the forward and backward trip of the car.

Another object of our invention relates to the manner of operating a car for discharging coils from a traveling conveyer into bins by the movement of the conveyer, by giving the car a step-by-step intermittent movement in the opposite direction to that of the traveling conveyer while discharging the coils into the series of bins, automatically reversing the movement of the car at the end of the trip so that the car and the conveyer will travel together simultaneously in the same direction to the opposite end of the series of bins without discharging coils and then, automatically reversing the movement of the car to give it again the reverse step-by-step movement.

Another object of our invention relates to the manner of automatically adjusting and holding the mouth or chute of the hopper stationary in alignment to register with one of the bins after each backward stroke of the swinging arm of the grasshopper movement.

Other objects of our invention relate to certain novel features of construction, combination and arrangement of parts which will be hereinafter more fully described and particularly pointed out in the appended claims.

Having thus given a general description of our invention we will now, in order to make the same more clear, refer to the five sheets of drawings accompanying and forming a part of this specification and in which like characters of reference indicate like parts:—

Fig. 1 is a diagrammatic top plan view illustrating the application of our invention, the figure being taken substantially on the line 1—1 of Fig. 2.

Fig. 2 is a side elevation of the device as shown in Fig. 1, with parts in section to more clearly show the construction, Fig. 3 is a front elevation drawn on a larger scale of the unloading car for discharging the bundles or coils of wire, rod stock or the like material, and showing the adjacent portion of the conveyer. The parts in full lines being in the position they will assume when the car is traveling forward simultaneously with the conveyer.

Fig. 5 is a front elevation similar to Fig. 3 but showing the parts in full lines at the end of one of the step movements or strokes in which the car is pushed backward by the conveyer by means of the grasshopper movement mechanism in the reverse direction to the line of travel of the conveyer.

Fig. 6 is a vertical longitudinal section through the lower portion of the car taken on the line 6—6 of Fig. 4.

Fig. 7 is a vertical transverse section through a portion of the car taken on the line 7—7 of Fig. 5.

Fig. 8 is a detail view of the dog and actuating mechanism for normally holding the car against traveling forward during the step-by-step backward movement of the car; and, Fig. 9 is a detail view of the connection between the actuating rod and the crank arm, mounted on the weighted lever shaft.

Figure 4:
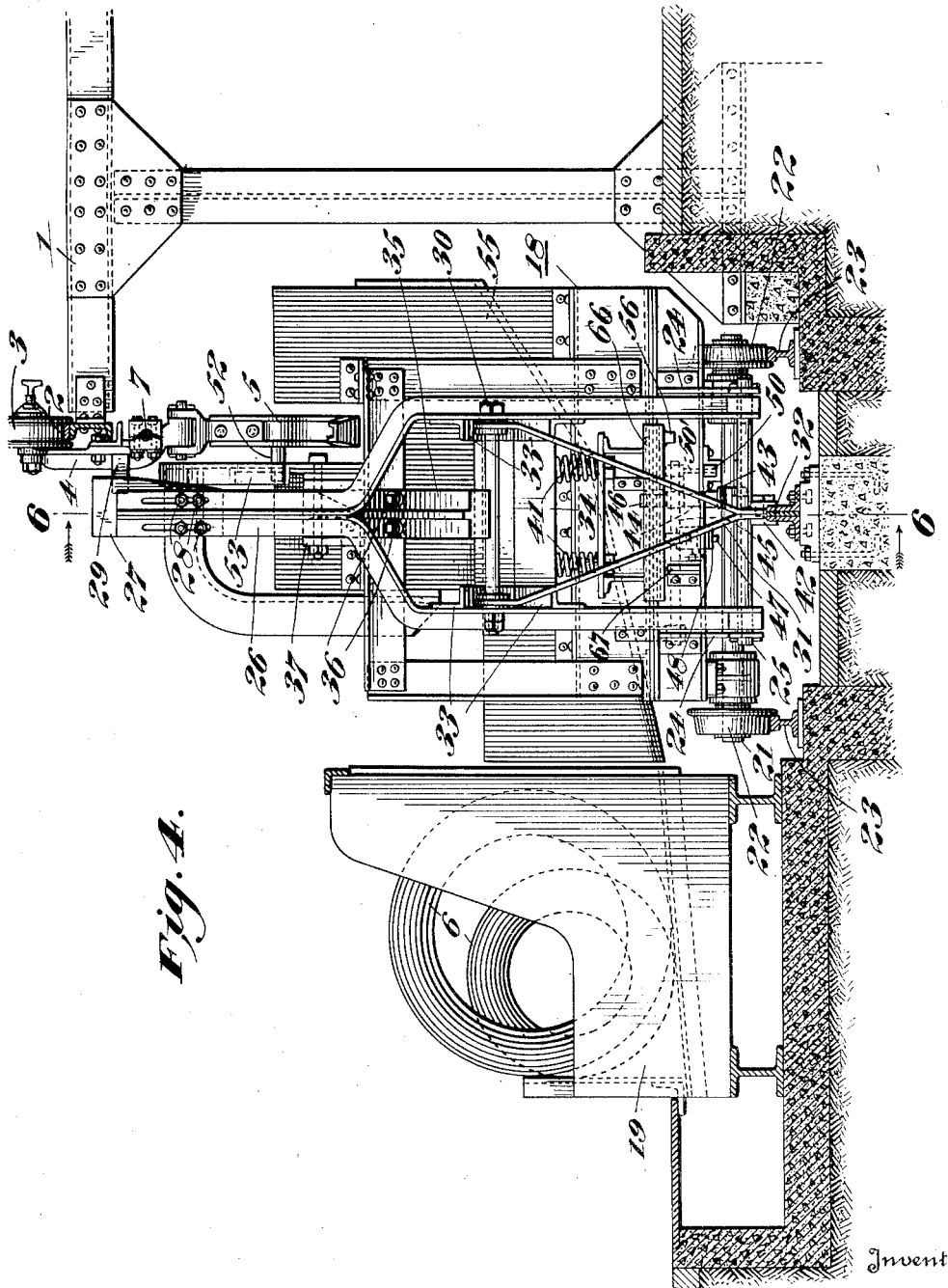
Fig. 4 is an end elevation of the car and adjacent portions of the conveyer and bin structure.

Referring now, to the various characters of reference on the drawings the numeral 1 indicates the frame work for supporting the conveyer having a continuous track 2 of elongated outline or path horizontally disposed at a suitable height above the floor of the mill. Guide-rollers or trolley-wheels 3 are mounted on the track 2 at spaced intervals, which are journaled in hangers 4, each having a hook 5 pivoted thereto and extending downwardly therefrom each adapted to receive and support a bundle of coiled rod stock 6 or the like material the outline of which in cross-section may be of any desired shape such as round, square, hexagonal, oval, or any other shape required. The hangers 4 are connected together by means of a cable 7, which extends around sheaves 8 and 9, mounted on shafts 10 and 11 at the opposite ends of the conveyer and rotated in any approved manner as by means of a motor 12, through gearing 13.

In forming the bundles of coiled rod stock and the line, after the shape passes through the finishing roll pass it is conducted while still red hot, through a guide pipe to the reel, which forms it into a coil or bundle and then discharging it onto a flight conveyer 14, which advances the coil onto the inclined portion 15, where it slides down and engages the flanged edge 16, the lever 17 is then operated in any suitable manner to raise the coil at the proper time to the position indicated in dotted lines in Figs. 1 and 2, where it is received by the hook and slowly advanced by the continuously traveling conveyer in the direction indicated by the arrows in the Figs. 1 and 2 from the loading or charging point opposite the sheave 9 to the car 18 where it is discharged and deposited in one of the bins 19 at the side of the car.

When the bundle of coiled rod stock or the like is first received by the hook at the loading point it is red hot but as the traveling conveyer is of considerable length, by the time it reaches the discharging car it has been cooled by its exposure to the atmosphere to a substantially black hot temperature. As the coils are deposited in the bins in sequence from right to left as shown in Fig. 1, the bins may nearly all be filled thereby giving the coils considerable more time to cool before any of them are removed, which may be done in any approved manner, as by passing a chain centrally through a plurality of the coils, beginning at the right hand end of the series of bins, and lifting them out of the bins by means of an overhead traveling crane and then transferring them to a storage yard, a car, or the like preparatory to further treatment, storage, or transportation, as required.

The discharging car 18 has axles 20 and 21 journaled in suitable bearings attached to the car body, having wheels 22 mounted thereon for engaging the track 23. A pair of spaced brackets 24 extend outwardly from one end of the car frame to which is pivoted to a shaft as at 25, the lower end of a grasshopper movement mechanism, comprising a swinging arm 26 composed of a pair of angles spaced apart at their lower ends and pivoted to the shaft 25. The intermediate portions of the angles which form the arm 26 are bent inwardly, and the upper end portions being attached together by means of a contact plate 27 and bolts 28, one leg of each angle being slotted to allow the contact plate 27 to be adjusted vertically to give a longer or shorter engagement with the projecting lugs 29 on the hanger 4, thereby varying the stroke of the arm. The spaced lower portion of the angles forming the arm 26 are further connected together by means of a bolt 30, upon which is pivoted the upper end or legs of a V-shaped pawl 31, the lower point of which is adapted to engage the teeth of a rack 32 which is secured to the floor or foundation between the track rails 23. A pair of angular brackets 33 extend outwardly from each leg at one side of the arm, the outer ends of which are connected together by means of a weight 34 which is adapted when the arm is moved forward to engage a downwardly inclined spring stop 35. The spring stop 35 is pivoted at its upper end by means of a bolt to a bracket secured to the end of the car, the intermediate portion of the stop is held resiliently in an inclined position by means of a pair of bolts 36 slidably attached to a bracket casting 37, each bolt having a spacing thimble 38 mounted thereon between the casting 37 and the stop to limit the downward movement of the stop, and a spring 39 on each bolt 36 between the casting and nuts 40, on the end of the bolts for returning the stop to its normal position. When the upper end of the arm 26 is moved forward to the end of its working stroke by means of the contact plate 27 engaging one of the projecting lugs 29 on the hangers, the upper face of the weighted portion 34 contacts with the lower face of the outer end of the stop, thereby raising it and compressing the springs 39. As soon as the contact plate 27 slides out of engagement with the projecting lug 29, the arm 26 returns to its normal position by the combined action of the weight 34 and the compressed springs 39, the lower face of the weight 34 on its return movement engaging the buffer springs 41 mounted on the car frame.

In order to limit the forward movement of the car during the return movement of the arm 26 to normal position a dog 42 is mounted on the axle 21 having an upwardly extending finger 43, for engaging a detent 44 mounted on a shaft 45. The detent 44 is formed with an upwardly extending contact arm 46, adapted to normally engage the side of the car frame and limit its movement in one direction while a lever 47 keyed to the shaft 45 having an adjustable weight 48 mounted thereon is adapted to return or hold the detent normally in a vertical position. After all of the bins 19 have been filled with coils 6, the dog 42 is raised on the cam surface 49, at the end of the rack 32. As the dog 42 is raised the detent 44 and weighted lever 47 will be rocked into the position shown in dotted lines in Fig. 8. After the finger 43 passes by the lower end of the detent 44, the weight 48, on lever 47, will return the detent to its normal position as shown in full lines, and the finger 43 will engage the opposite side of the detent 44 when it passes off the cam surface 49. The dog 42 will then be held in the position indicated in dotted lines, and will continue to be held in this position until it is released, which is accomplished when the crank arm 50' is pushed backward by means of the outer end of the actuating bar 50 coming in contact with the stop 51 when the car is advanced simultaneously with the traveling conveyer to the end of its return or forward trip.

As illustrated more clearly in Fig. 5, as the coils are advanced to the car, which at this point is held stationary on the track 23, a contact pin 52 formed integral with hook 5, engages the cam surface 53 of the angular member mounted on top of the car 18, and the lower portion of the coil 6 engages the inclined portion 54 of the hopper sheet as indicated in this figure and tilts the hook 5. As the traveling conveyer continues to advance the coil is deposited in the hopper 55 where it rolls downward by gravity through the open end of the projecting hopper chute into one of the bins 19, the bins at their sides next to the car being open to register with the open projecting end of the hopper chute.

After the coil 6 has been deposited in the hopper 55 by the hook 5, as it advances, the projecting lug 29, on the hanger 4 engages the contact plate 27 on the upper end of the pivoted arm 26 and pushes the arm from the dotted position illustrated in Fig. 5, to that shown in full lines thereby advancing the car a slightly greater distance than the space between adjacent teeth of the rack 32, or the width of one of the bins 19. The additional length of the stroke being to allow the lower ends of the pawl 31 and dog 42 to drop behind the rack tooth in the proper manner.

After the car has been intermittently pushed backward the full length of the series of bins and the last bin at the left has been filled, see Fig. 1, there is an overtravel of one additional stroke of the pivoted arm 26, to allow the end of the reversing rod 56 to engage a stop 57 and slide the rod forward to the position indicated in Fig. 3, thereby actuating the trigger 58 outward to engage the inside of the coil by means of the crank arms 59 and 60 mounted on the shaft 61. The crank arm 59 is slotted to receive a pin 62 which is secured to a sleeve 63 rigidly attached to the reversing rod 56, while the crank arm 60 is connected by means of a link 64 to an arm 65 extending from the trigger 58.

As the reversing rod 56 is pushed forward the angle 66 secured to the front end of the reversing rod 56 and sliding on the bracket 67 engages the pawl 31 and holds it out of engagement with the teeth of the rack 32. When the car is in this position the lower end of the dog 42 will rest on the cam surface 49 and will be held out of engagement with the rack and will be retained in this position by means of the finger 43 engaging the inner face of the detent 44, the car is now free to move forward with the traveling conveyer by means of the hook 5 engaging one of the coils 6 as indicated in Fig. 3, and will continue to move forward with the traveling conveyer until the forward ends of the reversing rod 56 and the dog actuating bar 50 come in contact with the stop 51 pushing them backward and allowing the pawl 31 and dog 42 to engage the teeth of the rack 32. As the reversing rod 56 is pushed back it lowers the trigger 58 and allows the coil to be discharged into the hopper 55 and roll by gravity into the first bin 19.

The operation of our machine is as follows:—Assuming that the parts are in the position indicated in Figs. 1, 2 and 4 to 9, in which the conveyer is adapted to continuously travel forward in the direction indicated by the arrows in Figs. 1, 2 and 5, while the unloading car is normally held stationary by means of the pawl 31 engaging a tooth of the rack 32 but adapted to be intermittently fed backward in the reverse direction to that of the traveling conveyer when the contact plate 27 engages one of the lugs 29, the material first having been rolled and coiled in the usual manner and then having been advanced by the flight conveyer 14 while still red hot to the position indicated in full lines in Figs. 1 and 2, the lever 17 then raises the coils into the vertical position indicated in dotted lines where they are received by the hooks 5 and continue to travel slowly down one side of the path of the traveling conveyer and back on the other side until they reach the car 18, during which time their exposure to the atmosphere cools the coils to a black hot condition.

As the hook 5 passes the car 18 it is tilted by means of the extending contact pin 52 formed integral with the hook coming into engagement with the cam surface 53, and the lower portion of the coils 6 coming in contact with the inclined portion 54 of the hopper sheet, and as the coil continues to advance, it is deposited in the hopper 55, where it rolls by gravity into one of the bins 19. After the contact pin 52 passes off the cam surface 53, the projecting lug 29, engages the contact plate 27 adjustably mounted on the upper end of the arm 26 and swings it forward until the upper end of the contact plate 27 slides off the projecting lug 29 and is returned to its normal position in contact with the buffer springs 41, by the combined action of the spring stop 35 and weight 34.

As the arm 26 is moved forward the lower end of the pawl 31 engages the vertical face of one of the teeth of the rack 32 acting as a fulcrum point for pushing the car a stroke backward a distance slightly greater than the width of one of the bins, or the space between the teeth of the rack 32, which is the same, in order to allow the pawl 31 and dog 42 to drop properly behind the rack teeth.

After each stroke or backward movement of the car the contact pin 52 engaging the inclined cam surface 53 and the coil 6 passing over the inclined portion 54 of the hopper sheet will advance the hopper slightly until stopped by the dog 42 in proper alignment so the mouth of the chute will register with one of the bins 19 and bring the lower ends of the pawl 31 and dog 42 in contact with the vertical faces of the rack teeth. As each hook 5 carrying a coil 6 passes through the car 18 the coil is automatically discharged and received in one of the bins, as above described until all the bins are filled, or until the end of the reversing rod 56 engages the stop 57 and the dog 42 is raised on the cam surface 49, and held in that position by the finger 43 engaging the detent 44. The car is then given an additional stroke backward to push the reversing rod 56 forward to the position indicated in full lines in Fig. 3. In this position the angle 66 will hold the pawl 31 out of engagement with the teeth of the rack 32 and at the same time throw the arm of the trigger 58 up into engagement with the inside of the coil 6. The car 18 is now free to travel forward simultaneously with the traveling conveyer and will continue to travel forward until the forward end of the reversing rod 56 and actuating bar 50 come in contact with the stop 51, thereby pushing them backward, throwing the arm of the trigger 58 downwardly out of engagement with the coil 6 and at the same time allowing the pawl 31 and dog 42 to fall by gravity into engagement with the teeth of the rack 32 thereby arresting the forward movement of the car.

The car in this position will have the mouth of the projecting chute of the hopper 55 opposite and in alignment with the open side of the first bin ready to receive the first coil in filling this series of bins, and then intermittently pushed backward and held stationary for an interval of time, and in each stationary position automatically receiving a coil from one of the hooks and discharging it into one of the bins and then repeating the operation as above described.

With our invention different sized coils or other similar annular shaped articles may be conveyed and deposited in the bins as illustrated in Fig. 4 equally as well, the coils being held in a vertical position in such a manner that a plurality of them can be easily removed from the bins when desired.

Although we have described and illustrated our invention in considerable detail, we do not wish to be limited to the exact and specific details, thereof, as shown and described, but may use such modifications in, substitutions for or equivalents thereof, as are embraced within the scope of our invention or as pointed out in the claims.

Having thus described our invention what we claim and desire to secure by Letters Patent is:

1. A machine for manipulating annular bodies, comprising a conveyer having means for receiving and advancing the annular bodies, and means actuated by the conveyer intermittently in one direction and continuously in the reverse direction of its line of travel for discharging the annular bodies from the conveyer.

2. A machine for manipulating annular bodies, comprising a conveyer for receiving and advancing the annular bodies, and independent means intermittently actuated by the conveyer in one direction and continuously in the reverse direction of its line of travel for discharging the annular bodies from the conveyer.

3. A machine for manipulating annular bodies, comprising a continuously traveling conveyer for receiving and advancing the annular bodies, means intermittently actuated in its line of travel by the conveyer in the reverse direction to the movement of the conveyer for discharging the annular bodies from the conveyer, and means for continuously advancing the said discharging means the full length of its time of travel with the conveyer.

4. A machine for manipulating annular bodies, comprising a continuously traveling conveyer for receiving and advancing the annular bodies, and independent means continuously advanced by the conveyer in one direction and intermittently actuated by the conveyer in the reverse direction to the movement of the conveyer for discharging the annular bodies from the conveyer.

5. A machine for manipulating annular bodies, comprising a traveling conveyer, means for feeding annular bodies to the conveyer, means for continuously driving the conveyer in one direction, and means actuated by the conveyer in the reverse direction to the movement of the conveyer intermittently in one direction and continuously in opposite direction of its line of travel for discharging the annular bodies from the conveyer.

6. A machine for manipulating annular bodies, comprising a traveling conveyer having means for continuously driving the conveyer in one direction for receiving and advancing the annular bodies, apparatus intermittently actuated by the conveyer in the reverse direction to the movement of the conveyer for discharging the annular bodies from the conveyer, and means for reversing the movement of the discharging apparatus and for continuously returning the discharging apparatus at the end of the discharging operation.

7. A machine for manipulating annular bodies, comprising a traveling conveyer having means for receiving and advancing the annular bodies, apparatus operated by the conveyer intermittently in one direction and continuously in the reverse direction of its line of travel for discharging the annular bodies from the conveyer, and means for reversing the movement of the apparatus.

8. A machine for manipulating annular bodies, comprising a conveyer for receiving and advancing the annular bodies, means for continuously driving the conveyer in one direction, apparatus intermittently actuated by the conveyer in the reverse direction to the movement of the conveyer for discharging the annular bodies from the conveyer, and means for reversing the movement of the discharging apparatus and for advancing it with the conveyer the full length of its line of travel at the end of the discharging operation.

9. In a machine for manipulating annular bodies, a conveyer for receiving and advancing the annular bodies, means for continuously driving the conveyer in one direction, a car having a line of travel with the conveyer for a portion of its length, bins opposite the line of travel, means mounted on the car for intermittently engaging the conveyer and intermittently driving the car in the reverse direction to the movement of the conveyer, means on the car for discharging the annular bodies from the conveyer into the bins, and means at each end of the line of travel for reversing the movement of the car.

10. In a machine for manipulating annular bodies, a conveyer for receiving and advancing the annular bodies, means for continuously driving the conveyer in one direction, a car having a line of travel at the side of the conveyer for a portion of its length, bins at the side of the line of travel, means pivotally mounted on the car for intermittently engaging the conveyer and give the car a step-by-step movement in the reverse direction to that of the conveyer, means on the car for discharging the annular bodies from the car into the bins, and means at the end of the line of travel for returning the car to the opposite end of its line of travel.

11. A machine for manipulating annular bodies, comprising a conveyer having means for receiving and conveying the annular bodies, means actuated to travel intermittently in the reverse direction to the conveyer for discharging the annular bodies and means adapted to give a continuous return movement to said discharging means to the end of its line of travel.

12. A machine for manipulating annular bodies, comprising a conveyer, provided with means for receiving the annular bodies, means for driving the conveyer, a car actuated to travel in a step-by-step movement in the reverse direction to the movement of the traveling conveyer for discharging the annular bodies, means for holding the car stationary while discharging the annular bodies and means for engaging the conveyer adapted to give the car a continuous return movement at the end of the discharging operation.

13. A machine for manipulating annular bodies, comprising a conveyer provided with means for receiving the annular bodies, means for driving the conveyer, independent means actuated by the conveyer to travel intermittently in the reverse direction to the conveyer for discharging the annular bodies and means for engaging the conveyer for giving said discharging means a continuous return movement to the end of its line of travel.

14. A machine for manipulating annular bodies, comprising a conveyer provided with means for receiving the annular bodies, means for continuously driving the conveyer, means intermittently actuated by the traveling conveyer in the reverse direction to the conveyer for automatically discharging the annular bodies between each intermittent movement and means for continuously advancing the discharging means with the conveyer to the end of its line of travel.

15. A machine for manipulating annular bodies, comprising a conveyer provided with means for receiving the annular bodies, means for continuously driving the conveyer in one direction, apparatus independent of the conveyer intermittently actuated by the traveling conveyer in the reverse direction to the movement of the conveyer for discharging the annular bodies, means for reversing the movement of the apparatus for discharging the annular bodies and means for continuously advancing the discharging apparatus with the conveyer to the end of its line of travel.

16. A machine for manipulating annular coils or the like, comprising a conveyer having means for receiving and advancing the coils, means for continuously driving the conveyer in one direction, apparatus associated with the conveyer having a line of travel alongside the conveyer for a portion of its length and actuated intermittently by the traveling conveyer in the reverse direction to the conveyer for discharging the coils in sequence the full length of the line of travel, bins at the side of the line of travel for receiving the coils, and means for reversing the movement of the discharging apparatus and advancing it continuously by means of the conveyer to the opposite end of the line of travel.

17. A machine for manipulating annular coils or the like, comprising a traveling conveyer having means for receiving and advancing the coils, a car having a line of travel in proximity with the conveyer for a portion of its length having means for automatically discharging the coils, means for imparting an intermittent movement to the car when traveling in one direction along its line of travel, and means for imparting a continuous movement to the car when traveling in the opposite direction of its line of travel, and means for reversing the movement of the car at the end of each line of travel.

18. A machine for manipulating annular coils or the like, comprising a traveling conveyer having means for receiving and advancing the coils in spaced relation to each other, a car formed with a hopper mounted to travel adjacent the conveyer for a portion of its length having means for automatically discharging the coils into the hopper, bins at the side of the line of travel for the car, a chute extension for the hopper for receiving and guiding the coils into the bins, means actuated by the movement of the conveyer for imparting an intermittent movement to the car when traveling in one direction along its line of travel, means for imparting a continuous movement to the car with the conveyer when traveling in the opposite direction of its line of travel, and means for reversing the movement of the car at the end of each line of travel.

19. A machine for manipulating annular coils or the like, comprising a conveyer having means for receiving and advancing the coils, a car actuated by the movement of the traveling conveyer for automatically discharging the coils, means actuated by the conveyer for intermittently driving the car in the reverse direction to the traveling conveyer, means for driving the car continuously in the same direction as the conveyer to the end of its line of travel, and means for reversing the movement of the car.

20. In a machine for manipulating annular coils or the like, a conveyer having means for receiving and advancing the coils, a car having a line of travel at the side of the conveyer for a portion of its length and actuated by the conveyer to drive it intermittently in discharging the coils from the conveyer in the reverse direction to the movement of the traveling conveyer, means for driving the car in the same direction with the conveyer, a reversing mechanism for the car, comprising a movable reversing rod, a stop at each end of the line of travel for the car for engaging either end of the movable reversing rod on the forward and backward movement of the car, a trigger pivotally mounted on the car for engaging or releasing a coil, an arm extending from the trigger, a shaft journaled on the car frame having a pair of crank arms mounted thereon, one pivoted to the movable reversing rod and the other connected by a link to the arm of the trigger.

21. In a machine for manipulating annular coils or the like, a conveyer having means for receiving and advancing the coils, a car actuated by the conveyer having a line of travel at the side of the conveyer for a portion of its length, a series of bins open at one side alongside the line of travel for the car, means actuated by the conveyer for intermittently driving the car in the reverse direction to the movement of the conveyer and discharging a coil from the conveyer into one of the bins between intermittent movements of the car, mechanism for reversing the movement of the car and driving it in the same direction as the conveyer, comprising a sliding reversing rod, a stop at each end of the line of travel for the car for engaging the end of the sliding reversing rod on the forward and backward movement of the car, a trigger pivotally mounted on the car body for engaging or releasing a coil, an arm extending from the trigger, a shaft journaled on the car frame having a pair of crank arms thereon, one of said crank arms being pivoted to the reversing rod and the other connected by a link to the arm of the trigger.

22. In a machine for manipulating annular coils or the like, a traveling conveyor having a plurality of spaced hook carriers for supporting the coils, a car having a line of travel at the side of the conveyor for a portion of its length, a series of bins alongside the line of travel for the car, means actuated by the conveyer for intermittently driving the car in the reverse direction to the movement of the conveyor and automatically discharging a coil from a hook of the conveyor into one of the bins between intermittent movements of the car, a sliding reversing rod, a stop at each end of the line of travel for the car for engaging the end of the sliding reversing rod on the forward and backward movement of the car, a trigger pivotally mounted on the car body and operated by the sliding reversing rod for engaging and holding a coil at the end of the final intermittent reverse movement of the car and simultaneously driving the car in the same direction with the conveyer to the other end of the line of travel until it engages the stop thereby sliding the reversing rod and releasing the coil and automatically discharging the coil into the first of the series of bins.

23. A machine for manipulating annular coils or the like, comprising a traveling conveyer having a plurality of spaced hook carriers for supporting the coils, a car having a line of travel at the side of the conveyer for a portion of its length, a series of bins alongside the line of travel for the car, means actuated by the conveyer for intermittently driving the car in one direction opposite to the movement of the conveyer, a hopper mounted on the car frame having an inclined face for engaging and tilting each coil, a member having a cam surface mounted on top of the car, a contact pin extending from each hook for engaging the cam surface to automatically discharge the coil into the hopper and into one of the bins, a sliding reversing rod, a stop at the end of each line of travel for the car, a trigger pivotally mounted on the car and operated by the sliding reversing rod for engaging and holding a coil at the final intermittent reverse movement of the car and simultaneously driving the car with the conveyer to the other end of the line of travel until it engages the stop thereby sliding the reversing rod and releasing the coil into the first of the series of bins.

24. In a device of the class described, the combination of a traveling conveyer having a plurality of spaced hook carriers for supporting coils to be conveyed, a car having a line of travel at the side of the conveyer for a portion of its length, a series of bins alongside the line of travel for the car, means actuated by the conveyer for intermittently driving the car in one direction opposite the movement of the conveyer for the full length of its line of travel, means for discharging a coil after each intermittent movement of the car into one of the bins, means for retaining one of the coils on one of the hooks at the end of the intermittent line of travel and simultaneously driving the car with the conveyer for the full length of its line of travel and then releasing the coil conveyed into the first bin of the series, and means for automatically reversing the movement of the car at the end of each line of travel.

25. In a device of the class described, the combination of a traveling conveyer having a plurality of spaced hook carriers for receiving annular articles to be conveyed, a car having a line of travel at the side of the conveyer for a portion of its length, spaced projecting lugs carried by the conveyer, a stationary rack extending parallel with the line of travel, a swinging arm pivoted to the car for engaging the projecting lugs, a pawl pivoted to the swinging arm for engaging the rack and forming a fulcrum for intermittently projecting the car backward in the reverse direction to the movement of the conveyor, and means for raising the pawl out of engagement with the rack for reversing the travel of the car for movement with the conveyer.

26. In a device of the class described, the combination of a traveling conveyer having a plurality of spaced hook carriers for receiving articles to be conveyed, a car having a line of travel at the side of the conveyer for a portion of its length, spaced projecting lugs carried by the conveyer, a swinging arm pivoted to the car, a contact plate adjustably secured to the swinging arm for engaging the projecting lugs, a stationary rack extending parallel the full length of the line of travel for the car, a pawl pivoted to the swinging arm for engaging the rack to form a fulcrum for intermittently projecting the car backward in the reverse direction to the movement of the conveyer when the contact plate on the swinging arm engages a projecting lug on the conveyer, a reversing rod having means for engaging the pawl and raising it out of engagement with the rack, brackets extending outwardly from the swinging arm, a weight supported by the brackets, a spring stop pivoted to the car for engaging the weight and returning the swinging arm to its normal position, and a buffer mounted on the car for engaging the weight in its normal position.

27. In a device of the class described, a traveling trolley conveyer, a plurality of trolley-wheels, a hanger for each trolley-wheel, a hook carrier pivoted to each hanger for holding the article conveyed, a contact pin extending from each hook carrier, means for connecting the hangers together, a car having a line of travel at one side of the conveyer for a portion of its length, said car actuated by the movement of the traveling conveyer intermittently in one direction and continuously in the reverse direction of its line of travel, and a cam surface on the car adapted to engage the contact pin for automatically discharging the articles conveyed from the hook carriers between each intermittent movement of the car.

28. In a device of the class described a traveling trolley conveyer, an endless track, a plurality of trolley-wheels mounted to travel on the track, a hanger for each trolley-wheel, means for connecting the hangers together, a hook carrier provided with a contact pin pivoted to each hanger for holding the article conveyed, a car having a line of travel at one side of the conveyer for a portion of its length, said car being actuated intermittently by the movement of the conveyer in one direction and continuously in the reverse direction of its line of travel, a cam surface on the car adapted to engage the contact pin for automatically discharging the articles conveyed from the hook carriers between each intermittent movement of the car, and means for reversing the movement of the car and for continuously advancing the car with the conveyer to the end of its line of travel at the end of the discharging operation.

29. In a device of the class described, a traveling trolley conveyer, means for continuously driving the conveyer, an endless track, a plurality of trolley-wheels mounted to travel on the track in equally spaced relation to each other, a hanger for each trolley-wheel, means for connecting the hangers together, a hook carrier provided with a contact pin pivoted to each hanger for holding the article conveyed, a charging and a discharging point for the articles conveyed on the conveyer, a car having a line of travel at one side of the conveyer, said car being actuated by the conveyer in a step-by-step movement in the reverse direction to the movement of the conveyer, a cam surface on the car adapted to engage the contact pin for automatically discharging the articles conveyed from the hook carrier, means for giving the car a continuous return movement with the conveyer to the end of its line of travel after the discharging operation, and a series of bins at the side of the discharging point of the conveyer for receiving the articles after they are discharged from the conveyer.

30. In a device of the class described, a continuously traveling conveyer, a plurality of spaced hook carriers on the conveyer for suspending articles to be conveyed, a contact pin extending from each hook carrier, a car having a line of travel at one side of the conveyer for a portion of its length, a cam surface on the car for engaging the contact pins of the hook carriers, said car being actuated by the conveyer in a step-by-step movement in the reverse direction to that of the conveyer for receiving and automatically discharging the articles conveyed from the hook carriers, means for giving the car a continuous return movement with the conveyer to the end of its line of travel after the discharging operation, and a series of bins at the side of the car for receiving the articles discharged from the car.

31. A device for manipulating bundles of coiled rod stock or the like material, comprising a traveling conveyer having a plurality of spaced hook carriers for receiving the coiled rod stock to be conveyed, a contact pin extending from each hook carrier, a car having a line of travel at the side of the conveyer, said car being provided with a cam surface for engaging the contact pin and actuated by the traveling conveyer in a step-by-step backward movement in the reverse direction to that of the traveling conveyer for receiving and automatically discharging the coiled rod stock conveyed by the hook carriers, a plurality of bins at the side of the car, each spaced to receive a bundle of coiled rod stock for each step-by-step backward movement of the car, means for reversing the movement of the car, and means for giving the car a continuous return movement with the conveyer to the end of its line of travel.

32. A device for manipulating bundles of coiled rod stock or the like, comprising a traveling conveyer having a plurality of spaced hook carriers for receiving the coiled rod stock to be conveyed, a contact pin extending outwardly from each hook carrier, loading and unloading points for the conveyer, a car having a line of travel at the side of the conveyer for a portion of its length, said car being provided with a cam surface adapted to engage the contact pins at the unloading point and actuated by the traveling conveyer intermittently in the reverse direction to the movement of the traveling conveyer for receiving and automatically discharging the bundles of coiled rod stock held by the hook carriers, a plurality of bins at the side of the car, each spaced to receive a bundle of coiled rod stock for each intermittent movement of the car, means for reversing the movement of the car, and means carried by the car for engaging the conveyer and advancing the car continuously with the conveyer to the end of the line of travel.

33. A device for manipulating bundles of coiled rod stock or the like, comprising a traveling conveyer, means for continuously driving the conveyer in one direction, a plurality of spaced carriers secured to the conveyer for receiving the coiled rod stock to be conveyed, loading and ejecting points for the conveyer, a plurality of bins at the ejecting point of the conveyer, a car actuated intermittently in a step-by-step movement by the traveling conveyer in the reverse direction to the movement of the traveling conveyer for receiving and automatically discharging a bundle of the coiled rod stock into one of the bins between step-by-step movements of the car, and means for reversing the movement of the car and to advance the car with the conveyer.
34. In a device of the class described, the combination of a trolley conveyer, comprising an endless track, a plurality of trolley-wheels mounted to travel on the track in spaced relation to each other, a hanger for each trolley, a flexible cable for connecting the hangers together, a hook carrier pivoted to each hanger for holding the article while conveyed, a projecting lug formed on each hanger, a charging and discharging point for the conveyer for the article conveyed, a car having a line of travel opposite the discharging point of the conveyer, a stationary rack extending parallel with the line of travel, a swinging arm pivoted to the car having an adjustable contact plate, a pawl pivoted to the swinging arm for engaging the rack to form a fulcrum for intermittently projecting the car in the reverse direction to the movement of the conveyer when the contact plate on the swinging arm engages a projecting lug on the conveyer, means for discharging one of the articles conveyed into the car between intermittent movements, a sliding reversing rod, a stop at the end of each line of travel for engaging opposite ends of the sliding reversing rod and thereby reversing the movement of the car, said reversing rod having means mounted thereon for engaging the pawl to lift it out of engagement with the rack, and means for returning the swinging arm after the contact plate engages the lug on the hanger to its normal position.
   35. A machine for manipulating annular coils or the like, comprising a conveyer, a car having a line of travel alongside the conveyer for a portion of its length, means actuated by the conveyer for giving the car a step-by-step movement in the reverse direction to the movement of the conveyer, means for holding the car stationary between each step-by-step movement, and means for reversing the movement of the car and advance it with the conveyer to the end of its line of travel.
   36. In a machine for manipulating annular coils or the like, a conveyer, comprising an endless track, a plurality of trolley-wheels mounted to travel on a track, a hanger for each trolley-wheel, a lug extending from each hanger, means for connecting the hangers together, a hook carrier pivoted to each hanger for holding the coils conveyed, a charging and discharging point for the coils conveyed, a car having a line of travel alongside the conveyer for a portion of its length, a swinging arm pivoted to the car for engaging the lugs on the hangers for giving the car a step-by-step movement in the reverse direction to the movement of the conveyer, means for holding the car stationary to discharge a coil from the conveyer between step-by-step movements, a reversing rod mounted on the car, a stop at each end of the line of travel for the car, a trigger operated by the reversing rod to hold a coil and advance the car with the conveyer to the opposite end of the line of travel and then release the coil.
   37. In a machine for manipulating annular coils or the like, a conveyer, comprising an endless track, a plurality of trolley-wheels mounted to travel on the track, a hanger for each trolley-wheel, a lug extending from each hanger, means for connecting the hangers together, a hook carrier pivoted to each hanger for holding the coils conveyed, a charging and discharging point for the coils conveyed, a car mounted on a track having a line of travel alongside the conveyer for a portion of its length, a stationary rack extending parallel with the car track, a swinging arm pivoted to the car, a pawl pivoted to the swinging arm for engaging the rack, a contact plate on the arm for engaging the lugs on the hangers for giving the car a step-by-step movement in the reverse direction to the movement of the conveyer, a dog rotatably mounted on the car for normally engaging the rack to limit the movement of the car in one direction, means for raising and holding the dog out of contact with the rack and means for returning the dog to its normal position.
   38. In a machine for manipulating annular coils or the like, a conveyer, comprising an endless track, a plurality of equally spaced trolley-wheels mounted to travel on the track, a hanger for each trolley-wheel, a lug extending from each hanger, a flexible cable connecting the hangers together, a hook carrier pivoted to each hanger for holding the coils conveyed, a charging and a discharging point for the coils conveyed, a car mounted on track rails and having a line of travel alongside the conveyer for a portion of its length, a stationary rack mounted between the track rails and extending parallel therewith, a swinging arm pivoted to the car, a pawl pivoted to the swinging arm for engaging the rack, an adjustable contact plate on the arm for engaging the lugs on the hangers for giving the car a step-by-step movement in the reverse direction to the movement of the conveyer, means for returning the swinging arm to its normal position after engaging the lugs, a dog having an extending finger rotatably mounted on the car for normally engaging the rack to limit the movement of the car in one direction, a cam surface at the end of the rack for raising the dog, a detent rotatably mounted on a shaft for engaging the finger to hold the dog when raised, a contact arm on the detent for normally holding the detent in a vertical position, a weighted lever for rocking the detent in one direction and an actuating bar for rocking the detent in reverse direction to that of the weighted lever, a reversing rod for reversing the movement of the car, a trigger connected to the reversing rod, a stop at one end of the line of travel for engaging one end of the reversing rod and sliding it in one direction to raise the pawl out of engagement with the rack and raise the trigger to hold a coil and allow the car to move forward with the conveyer, and a stop at the opposite end of the line of travel to engage the actuating bar and release the dog and contact with the reversing rod to release the pawl and coil and reverse the movement of the car.

In testimony whereof I hereunto affix my signature.

RICHARD H. STEVENS.

In testimony whereof we hereunto affix our signatures.

WILLIAM C. FRANK.
HARRY T. KELLY.